(12) United States Patent
Wagner

(10) Patent No.: US 6,511,734 B1
(45) Date of Patent: Jan. 28, 2003

(54) METHOD AND APPARATUS FOR PRODUCING A SURFACE-STRUCTURED, FILM SEMI-FINISHED PRODUCT WITH THE APPLICATION OF PRESSURE

(75) Inventor: Werner Wagner, Alcudia (ES)

(73) Assignee: HCD Hygienic Composites Development GmbH, Muelheim an der Ruhr (DE)

( * ) Notice: Subject to any disclaimer, the term of this patent is extended or adjusted under 35 U.S.C. 154(b) by 0 days.

(21) Appl. No.: 09/787,576
(22) PCT Filed: Sep. 11, 1999
(86) PCT No.: PCT/EP99/06739
§ 371 (c)(1), (2), (4) Date: Apr. 25, 2001
(87) PCT Pub. No.: WO00/16965
PCT Pub. Date: Mar. 30, 2000

(30) Foreign Application Priority Data

Sep. 21, 1998 (DE) .......................................... 198 43 109

(51) Int. Cl.[7] .......................... B32B 3/02; B32B 33/00; D06N 7/04; B29C 49/00; D06C 29/00; D06C 11/00
(52) U.S. Cl. .......................... 428/152; 428/91; 428/85; 264/284; 26/29 R; 26/2 R
(58) Field of Search .......................... 428/152, 85, 91; 26/29 R, 2 R; 264/284

(56) References Cited

U.S. PATENT DOCUMENTS

| 3,399,425 A | * | 9/1968 | Lemelson |
| 3,983,278 A | * | 9/1976 | Wardle ......................... 428/92 |
| 4,189,336 A | * | 2/1980 | Hutflesz ....................... 156/72 |
| 4,308,649 A | * | 1/1982 | Gilpatrick et al. ............. 26/2 R |
| 4,451,419 A | * | 5/1984 | Bye et al. .................... 264/164 |
| 5,099,553 A | * | 3/1992 | Dischler ....................... 26/2 R |
| 5,505,747 A | * | 4/1996 | Chesley et al. ............... 51/297 |

FOREIGN PATENT DOCUMENTS

| DE | 19524076 |   | 7/1995 |
| DE | 19605788 | * | 5/1997 |
| JP | 01014364 | * | 1/1989 |

* cited by examiner

Primary Examiner—Harold Pyon
Assistant Examiner—Patricia L. Nordmeyer
(74) Attorney, Agent, or Firm—Milde & Hoffberg, LLP

(57) ABSTRACT

A method and apparatus are disclosed for producing a surface-structured, film semi-finished product made of a thermoplastic which is applied onto a prepared surface with numerous fine cavities provided in the form of pocket borings and is correspondingly shaped. The solidified plastic material is removed from the surface as a structured film, whereby the thermoplastic material which is inserted into the cavities and removed from the same forms a pile comprised of projections and naps. The projections which form the pile are stretch by combing, brushing, using a squeegee, and/or by squeezing by shearing in order to form naps.

17 Claims, 2 Drawing Sheets

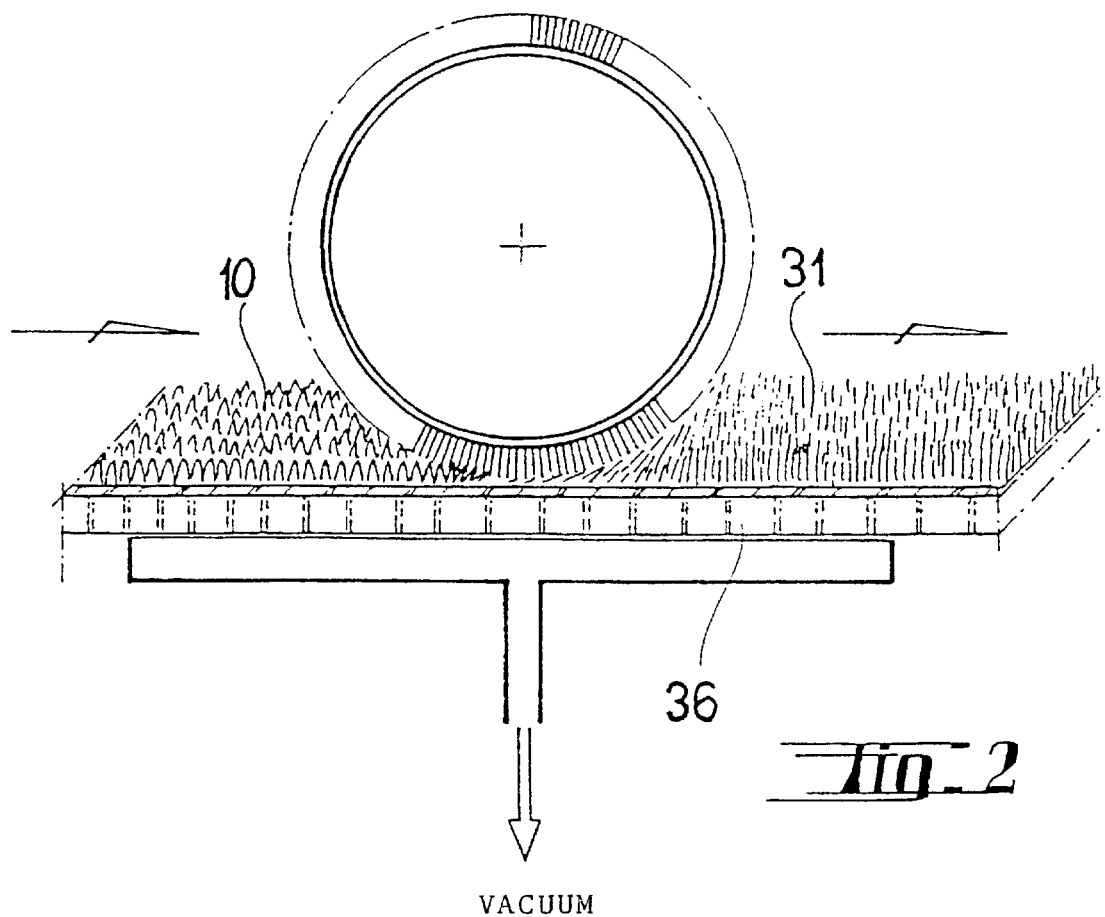
VACUUM
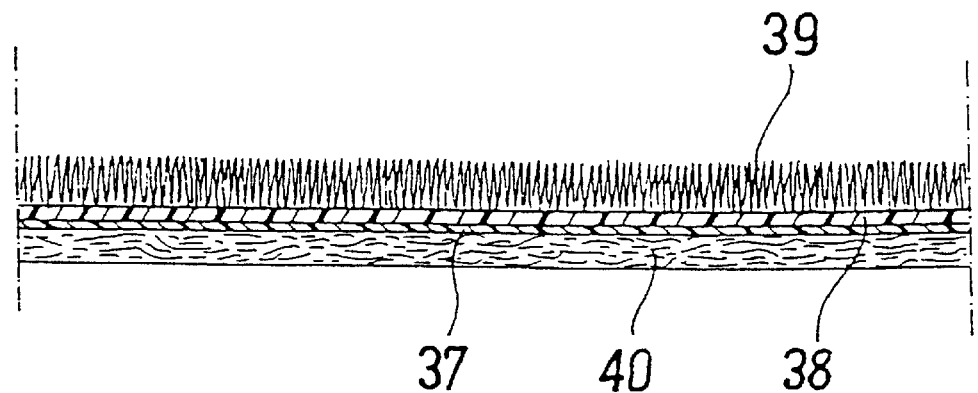

METHOD AND APPARATUS FOR PRODUCING A SURFACE-STRUCTURED, FILM SEMI-FINISHED PRODUCT WITH THE APPLICATION OF PRESSURE

BACKGROUND OF THE INVENTION

The invention relates to a method and apparatus for producing a surface-structured, film-like semi-finished product made of thermoplastic which is applied onto a prepared surface with variable temperature that serves as a surface structure negative (matrix) for the desired product, in melted or film state, whereby the surface has low adhesion to the plastic material and is provided with numerous fine cavities. The surface is maintained at the melting temperature at least in the areas in contact with the plastic. The shaped, thermoplastic plastic material is solidified by cooling while still in contact with the surface whereby it assumes the corresponding surface structure. The hardened plastic material is removed from the surface as a structured film, whereby the thermoplastic material which is inserted into the cavities forms a pile comprised of projections and naps. The invention is related further to products manufactured by this process, and to a device to perform the process.

From the German Patent No. DE 195 24 076, manufacture of surface-structured, film-like semi-finished products made of thermoplastic is known in that the thermoplastic material is extruded in melted form by a cylindrical, rotatable roller surface whose temperature may be adjusted, whereby the thermoplastic material is in firm contact with the surface structure of the roller surface. The melted thermoplastic material is solidified by cooling, and is removed from the roller surface. During this process, a napped or crepe surface of the semi-finished film is produced that corresponds to the fine cavities. Pressing or deep drawing of plastic films to shape them is also known.

It has proven very difficult to provide fine projections and nap (for example, on the order of 3,000 to 20,000 units per cm$^2$) to the upper surface of plastic film using the above-named process. It is also very difficult to extract the film projections from the deep cavities of the tool. Experience has shown that a certain portion of the film projections remain trapped in the cavities, so that they fall out during the next formation cycle, rendering the resulting product unusable after a short time.

SUMMARY OF THE INVENTION

Accordingly, the object of the invention is to produce a semi-finished product made of thermoplastic using a casting or application process without tearing off the small projections or nap in the cavities, but rather for which a sealed surface may be produced uniformly in several working steps.

This object, as well as other objects which will become apparent from the discussion that follows, are is achieved, according to the invention, using a process that comprises the following steps:

A thermoplastic material is applied in melted form or in the form of a film to a surface with adjustable temperature which forms a surface structure negative (matrix) to the final structure desired and which has low adhesion to the plastic material and numerous fine cavities in the form of blind holes. This surface is maintained at the melting temperature of the plastic at least in the contact area.

By pressure on the plastic material, this material is forced into the cavities under compression of the volume remaining in the cavities, so that the matrix is filled, but the cavities are only partially filled by the thermoplastic material.

The formed thermoplastic material is solidified by cooling while still on the surface, whereby it assumes a surface pattern corresponding to that of the surface with which it was in contact.

The pressure on the plastic material is released, whereby the air compressed within the cavities at least partially forces the plastic material out.

The solidified plastic material is removed from the surface as a structured film, whereby the thermoplastic material forced into the cavities and extracted from them forms a crepe surface consisting of projections and naps.

The plastic material is forced into the cavities under compression of the volume remaining in the cavities particularly by pressure, whereby over-pressure of from 2 to 5 bar may be used, so that the matrix is filled but the cavities are only partially filled by the thermoplastic material. When the pressure on the plastic material is released, the air compressed within the cavities expands and partially forces the plastic material out of the cavities. Since the projections and naps are connected with the other plastic materials, it is now easy to extract the projections normally subject to tearing.

This presupposes that the matrix is of a nature that it possesses a low degree of adhesion to the plastic material. Such matrices may be formed as a single piece from PTFE plastic according to known procedures.

A basic version of such rollers is described in the German Patent No. DE 195 24 076. Inclusion of fine cavities may be performed by a laser drill, for example. Rollers with steel cores covered by a 0.5~10 mm thick coating of fluoroplastic are particularly suited to this. Such fluoroplastic might be polyfluoroethylene or a fluoro-rubber such as products marketed by Du Pont under the trademark VITON™, for example. The plastic layer must be able to withstand long-term roller temperatures of 200° C. to 250° C. Other suitable plastic roller coatings may be selected from the polyamide or polysulfone groups. Rollers made completely of steel or of steel with a metal or alloy coating may also be used.

For plastic materials to be treated, known thermoplastics may be used which include polyolefins, polyisopropylenes, polyesters, polyvinylalcohols, polyurethanes, polyesterethers, polyamides, polyvinyl chlorides, polysulfones, polycarbonates, ABS, ASA, polyesteramides, or mixtures or co-polymers thereof.

Removal of the structured film occurs at a temperature of 40° C. to 60° C., so that the film possesses a somewhat soft and easily-treated consistency. The temperature itself that enables the casting or melting of the plastic may be determined based on information from manufacturers, and may vary from case to case.

The pressure on the plastic material is preferably applied in a roller gap, i.e., by a roller pressing on the plastic material.

The length of the projections and naps is preferably between 50 and 200 $\mu$m. For this, the length of the projections and naps represents 20% to 60% of the depth of the cavities. The density of projections or hair fibers is preferably between 3,000 and 20,000 units per cm$^2$.

The process may be considerably expanded by a step in which the projections forming the crepe surface are processed by combing, brushing, raking, and/or scissoring, thereby increasing the length of the crepe finish projections on an average to at least twice their normal length, producing a semi-finished product with a structured fiber finish on at least one side for which the projections are lengthened into hair fibers.

A device to perform the process according to the invention includes a pair of rollers from which the one roller (1) is adjustable in temperature and possesses a surface worked to produce a negative structure (matrix) of the desired structure, (2) possesses low adhesive qualities to the plastic material, and (3) has numerous fine cavities in the shape of blind holes. At least a portion of the roller surface may be heated to the melting temperature of the thermoplastic material to be used. The plastic material may be pressed into the structure of the heated roller by a second roller of the pair, preferably also heated. Further, a cooling device is provided to cool the roller surface and the plastic material applied to it after it has passed through the roller gap, as is a stripping device to remove the solidified structured film.

The process normally involves two rollers, therefore, of which the matrix roller is left at a temperature of 40° C. and the second smooth steel roller, for example with polyethylene, is kept at a temperature of 140° C. ±5° C. The steel roller heats the plastic film and radiant heat also softens it and heats it to 145° C. The plastic material is pressed into the matrix and the cavities in the roller gap, and then is cooled there. Further characteristics of the device used to perform the process are explained below using embodiment examples.

Products produced by this process may be manufactured as mono- or multi-layer products or as a semi-finished or finished product with lengthened fibers.

It is possible that the layer provided with a crepe surface may consist of a lighter freely-flowing (when heated) polymer produced from a highly-viscous polymer.

Also, the side opposite to the fiber crepe finish might be bonded to a carrier material such as fabric, woven, or non-woven material.

For a full understanding of the present invention, reference should now be made to the following detailed description of the preferred embodiments of the invention as illustrated in the accompanying drawings.

BRIEF DESCRIPTION OF THE DRAWINGS

FIG. 2 is a manufacturing procedure with a flat semi-finished product configuration.

FIG. 3 is a cross-section of a semi-finished product layer based on a preferred embodiment.

DESCRIPTION OF THE PREFERRED EMBODIMENTS

Figure 1:
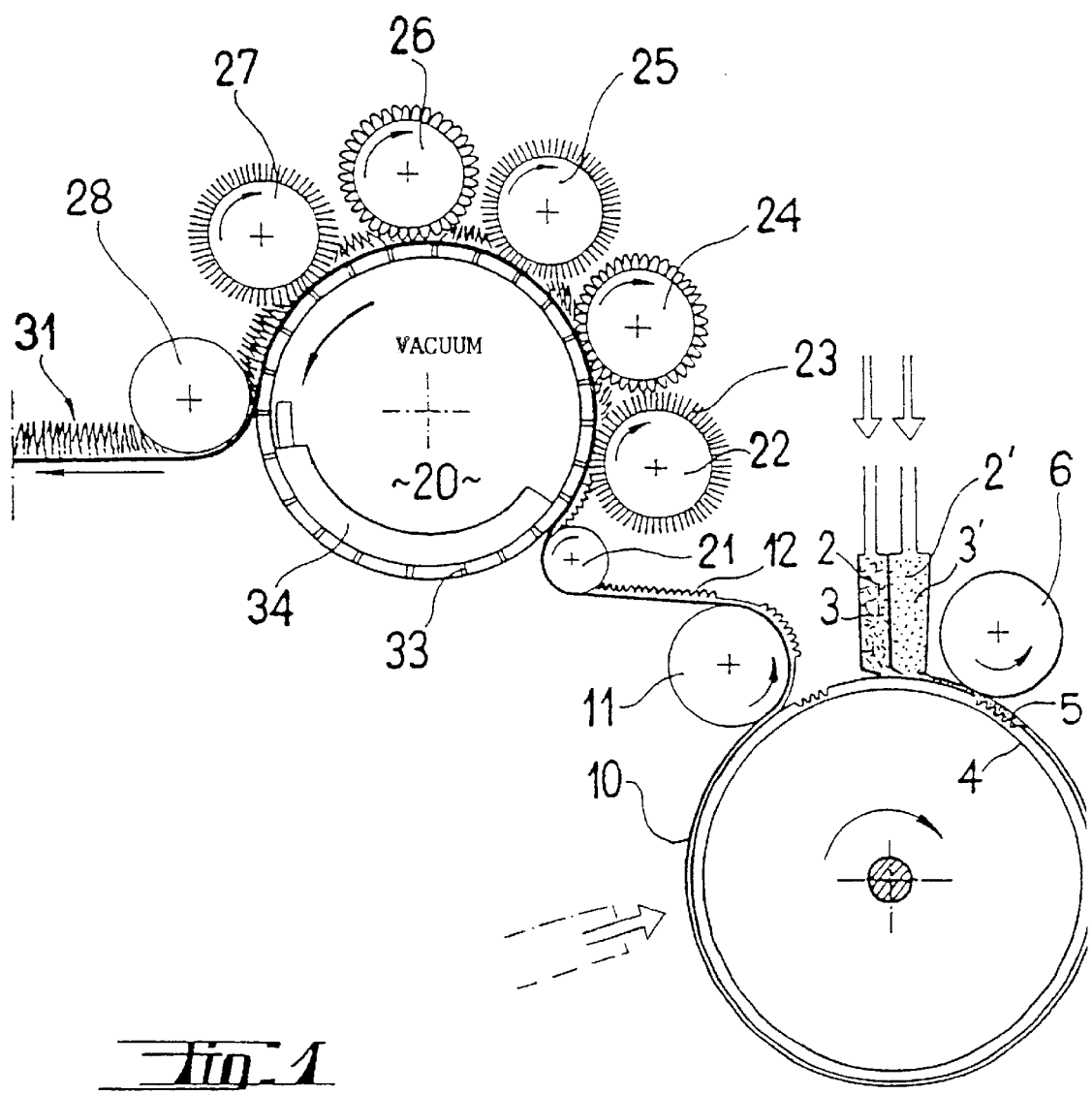
FIG. 1 is a schematic side view of a device to produce a thermoplastic semi-finished product.

The preferred embodiments of the present invention will now be described with reference to FIGS. 1–3 of the drawings. Identical elements in the various figures are designated with the same reference numerals.

FIG. 1 shows a device for the manufacture of a film-type semi-finished product in various stages. In this embodiment example, a two-layered semi-finished product is produced with a crepe finish of polyethylene.

Melted and homogenized material is fed from two snail extruders (not shown) via a multiple jet with apertures 2 to 2'. A compression ratio of 1:2.5 and a snail temperature of 250° C. is maintained in the extruders. Both polyethylene melts 3, 3' are applied to a chill roll matrix roller 4 under constant pressure.

The rotatable matrix roller 4 provided with a negative-structured matrix possesses numerous fine cavities. The total surface of the matrix 5 consists of a covering of PTFE plastic about 2 mm thick. Along with a knobby structure, this PTFE also possesses numerous fine cavities in the form of blind holes bored by a laser drill to a depth of from 400 to 600 $\mu$m. The surface diameter is about 40 to 70 $\mu$m.

The melted plastic material applied to the roller surface is pressed onto the surface of the matrix roller under high pressure by means of a pre-pressure roller 6. During this, the melted material is pressed into the existing cavities, compressing the air contained in the cavities and partially filling the cavities with thermoplastic plastic material under relatively high pressure. The pressure used is between 3 and 10 bar.

A relatively free-flowing polyethylene is used as the material that is directly in contact with the matrix roller and is forced into the cavities for the multi-layer extrusion mechanism recommended here, while a less free-flowing polyethylene that provides stiffness is used for the upper layer. The film exiting from the roller gap has an overall thickness of about 60 to 80 $\mu$m. At the same time, the crepe finish layer should be at least 40 $\mu$m thick. For the latter, an LLDP polymer is used with average a molecular weight and a melting index of MFI 30 measured at 190° C./2.16 g, 10 minutes, and a density of 0.8955.

The stiffness layer consists of mixtures of polyethylene that possess a relatively high viscosity. The material includes the usual lubricants, stabilizers, pigments, and similar additives. The shaped thermoplastic plastic material is solidified by cooling while it is still lying on the matrix roller. This may be accomplished, for example, by a water bath or by cooled air. The side of the material in contact with the matrix 5 assumes the corresponding texture. An extractor roller 11 removes the hardened plastic material from the surface of the roller 4, and is further treated as a semi-finished product 10. With its textured surface facing outward, the semi-finished product is passed to another rotating drum 20 that is heated to a temperature of about 40 to 80° C. In this condition, the semi-finished product removed from the matrix roller 4 has a lightly-pressed crepe finish 12 on its surface consisting of numerous naps and protrusions. The height of the crepe finish as measured from the surface is about 100 to 120 $\mu$m, based on a cavity depth of 400 $\mu$m. The semi-finished product 10 may also be used as a finished product for certain purposes.

If, following treatment, a fiber structure with long fibers is to be created, a post-process is performed on the rotating drum 20 to create a velour texture on the surface of the film.

The semi-finished product 10 is applied via a pressure roller 21 against the coating surface of the rotating drum 20, and is affixed to it using vacuum. In the course of successive workstations, the semi-finished product is processed by a first rough roller 22. The rough roller 22 is covered with metal scratchers that extend the length of the projections and naps by a factor of 2 to 20 by stretching them. The relatively "plump" projections then become fiber-like, extended formations with a fiber length of 250 to 400 $\mu$m.

Further processing of the semi-finished product is performed in several stages. A combing roller 24 is positioned following the rough roller 22 that combs the erect and extended material, positioning it in a certain direction. After this, a second rough roller (similar in construction to rough roller 22) performs a second stretching and extension of the projections, nap, and hair fibers. This is again followed by a combing roller 26, which in turn is followed by another rough roller 27. After this processing, a very fibrous, almost velvet formation is produced of which only the surface is correspondingly covered with hair fibers without affecting the basic fabric, as occurs when textile is roughened. The semi-finished product is removed via an additional direction-changing roller 28, and then is passed to a storage container or cutting station.

Instead of the rough brush 22, other brushes or scratchers may be used by means of which the projections may be lengthened or stretched. The significant factor is that the relatively flat structure is regulated by brushing or by trimming whereby the length of the crepe finish projections in the material are at least doubled in length. In general, higher values are attained. The projections are stretched by more than a factor of ten.

If post-processing is not desired, then very thin, elastic films (from 40 to 80 μm) may be removed from the rollers directly as a finished product. In principle, the surface of all plastics available as a film with thermoplastic shaped surfaces may be transformed into a velour surface according to the method, i.e., single-layer and multi-layer extruded films, blown or cast films, and combinations based on various classes of polymers. In such cases, a finished blown or extruded film is preferably passed to the roller from a supply, whereby a first direction-changing and pressure roller (not shown) is used instead of the two extruder heads.

The film lying on the roller coating may be fed to the gap between the two rollers 4 and 6 where it is forced into the blind hole cavities.

Materials such as polyolefins, particularly polyethylene, polypropylene, polybutylene, and polyisopropylene, as well as mixtures or co-polymers have proven to be suitable. However, plastics such as polyester, polyesterether, polyamide, polyurethane, polyvinylalcohol, polyvinyl chloride, polysulfone, acrylonitrile-butadiene-styrene copolymer (ABS), acrylic ester-modified styrene acrylonitrile terpolymer (ASA), polyisopropylene, polycarbonate and mixtures and copolymers thereof may also be used.

Empirically-determined melting point values may be taken from the respective tables or experimental results.

For this, the processing method must provide for maintenance of melting temperature at least in the contact area with the surface. This may particularly be achieved using conductive heat, e.g., using additional heating rollers, or by means of radiant heat, ultra-sound, or microwaves.

The crepe finish film is cooled before removal from the shaping device (here, roller 4).

Use of a discontinuous method should not be ruled out, whereby each film or plastic may be spread on a horizontal flat surface and then pressed into cavities using a pressure plate or pressure roller and then removed as a flat sheet.

The matrix roller 4 may consist, for example, of a steel roller that may be heated and cooled, and that includes a several-millimeter-thick coating of high-quality fluoro-rubber such as is available from DuPont under the product name VITON™. The desired cavities are configured in this fluoro-rubber coating using a laser drill. A density of 2,500 to 3,000 holes per $cm^2$ may be achieved without difficulty.

The film is heated to 140° C. using a pre-heating roller. Additional radiant heating may be used to heat the side of the material in contact with the roller to 145° C. The matrix roller itself is maintained at 60° C., and the film is forced into the roller cavities by applied pressure of about 10 bar.

The naps have a length of 100 to 120 μm.

The films produced by this method may be used as a textile backsheet in the hygiene industry, or as an outer surface material in the furniture industry. The film may be further treated by impregnation, perforation, weaving, etc. Impression is also possible. Using the proper protrusion structure, the appearance of the film may be improved.

There has thus been shown and described a novel method and apparatus for producing a surface-structured, film-like semi-finished product with the application of pressure which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Process for manufacturing a surface-structured semi-finished multi-layer film product from a thermoplastic, said process comprising the following steps:

applying at least two layers of a thermoplastic material in melted form or in the form of a laminate film onto a surface formed by a metal roller with a separate external coating, said surface having an adjustable temperature and providing a negative structure (matrix) for the desired product, the plastic material having a lower layer of lighter, freely-flowing polymer in contact with the surface and an upper layer of heavier, more viscous polymer, wherein the surface has low adhesion to the plastic material and is provided with numerous fine cavities in the form of blind holes which are laser-drilled in the coating covering the roller, and wherein the surface is maintained at the melting temperature of the lower layer of plastic material at least in the area of initial contact;

forcing the lower layer of the plastic material into the surface under compression of the remaining volume of plastic material, so that the matrix is filled, but the fine cavities are only partially filled by the plastic material, wherein the pressure on the plastic material is applied by a second roller in a roller gap;

solidifying the shaped, plastic material by cooling while still in contact with the surface, wherein it assumes the corresponding surface structure;

releasing the pressure on the plastic material, wherein the air compressed within the fine cavities at least partially forces the plastic material out;

removing the hardened plastic material from the surface as a structured film, wherein the plastic material which is inserted into the cavities and removed from the same forms a pile comprised of projections and naps.

2. Process as in claim 1, wherein the plastic material is a thermoplastic material selected from the group consisting of polyolefins, polyisopropylenes, polyesters, polyvinylalcohols, polyurethanes, polyesterethers, polyamides, polyvinyl chlorides, polysulfones, polycarbonates, acrylonitrile-butadiene-styrene copolymer (ABS), acrylic ester-modified styrene acrylonitrile terpolymer (ASA), polyesteramides, and mixtures and co-polymers thereof.

3. Process as in claim 1, wherein the removal of the structured film occurs at a temperature in the range of 40° C. to 60° C.

4. Process as in claim 1, wherein the removed film is affixed to a processing roller.

5. Process as in claim 1, wherein the pressure on the plastic material is applied in a roller gap.

6. Process as in claim 1, wherein the length of the projections and nap is in the range of 20% to 60% of the depth of the cavities.

7. Process as in claim 1, wherein the density of projections or hair fibers is in the range of 3,000 to 20,000 units per cm$^2$.

8. Process as in claim 1, wherein the projections producing the crepe finish are erected by a working process selected from the group consisting of combing, brushing, raking, and scissoring, thereby increasing the length of the crepe finish projections on an average to at least twice their normal length, producing a semi-finished product with a structured fiber finish on at least one side for which the projections are lengthened into hair fibers.

9. Apparatus for carrying out the process recited in claim 1, comprising, in combination: a pair of rollers comprising a first roller and a second roller, said first roller being adjustable in temperature and possessing a surface worked to produce a negative structure (matrix) of the desired structure, and possessing low adhesive qualities to the plastic material, and having numerous fine cavities in the shape of blind holes, and means for heating at least a portion of the surface of the first roller to the melting temperature of the thermoplastic material to be used, and said second roller pressing the plastic material into the structure of the heated roller, and with a cooling device to cool the roller surface and the plastic material applied to it after it has passed through the roller gap by means of which the solidified structured film may be removed.

10. The apparatus recited in claim 9, further comprising a device with a working surface which receives one side of the semi-finished product such that the opposite side of the semi-finished product provided with the fiber crepe finish is exposed, and a working device selected from the group consisting of a comb, brush, rake, and scissor is arranged in the area of the crepe finish surface of the semi-finished product in order to produce hair fibers.

11. Semi-finished film product produced according to the process recited in claim 1.

12. Semi-finished film product as recited in claim 11, comprising at least two layers, including:

(1) a layer provided with the crepe finish made of a polymer that flows more freely when heated, and (2) a back layer made of a highly-viscous polymer.

13. Semi-finished film product with a crepe finish produced according to the process recited in claim 1, wherein the side opposite to the crepe finish side is bonded with a carrier material.

14. Semi-finished film product recited in claim 13, wherein the carrier material is selected from the group consisting of fabric, woven, and non-woven material.

15. The apparatus defined in claim 10, wherein said working device includes at least one roughing roller.

16. The apparatus defined in claim 10, wherein said working device includes at least one combing roller.

17. Process as in claim 1, wherein the length of the projections and nap is in the range of 50 mm to 200 mm.

* * * * *